US011483234B2

(12) United States Patent
Mermoud et al.

(10) Patent No.: US 11,483,234 B2
(45) Date of Patent: Oct. 25, 2022

(54) PREDICTIVE ROUTING-BASED POLICY ADJUSTMENTS IN SOFTWARE-DEFINED NETWORKS

(71) Applicant: Cisco Technology, Inc., San Jose, CA (US)

(72) Inventors: Grégory Mermoud, Venthône (CH); Jean-Philippe Vasseur, Saint Martin d'Uriage (FR); Pierre-André Savalle, Rueil-Malmaison (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1 day.

(21) Appl. No.: 17/191,233

(22) Filed: Mar. 3, 2021

(65) Prior Publication Data

US 2022/0286388 A1  Sep. 8, 2022

(51) Int. Cl.
*H04L 12/46* (2006.01)
*H04L 45/00* (2022.01)
*H04L 45/64* (2022.01)

(52) U.S. Cl.
CPC .............. *H04L 45/36* (2013.01); *H04L 45/14* (2013.01); *H04L 45/64* (2013.01)

(58) Field of Classification Search
CPC ....... H04L 45/70; H04L 45/124; H04L 45/22; H04L 45/30; H04L 45/306; H04L 45/64; H04L 47/12; H04L 47/122; H04L 45/00; H04L 45/302; H04L 47/125; H04L 49/358; H04L 49/503; H04L 41/507; G06F 9/5077; G06N 20/00; G06N 20/20; G06N 5/003; G06N 7/005
See application file for complete search history.

(56) References Cited

U.S. PATENT DOCUMENTS

| | | | |
|---|---|---|---|
| 10,116,521 B2 | 10/2018 | Kokkula et al. | |
| 10,862,758 B2 | 12/2020 | Sethi et al. | |
| 2017/0104682 A1* | 4/2017 | Zahid | H04L 45/302 |
| 2017/0171066 A1* | 6/2017 | Hao | H04L 45/125 |
| 2019/0334820 A1* | 10/2019 | Zhao | H04L 47/12 |
| 2020/0314022 A1 | 10/2020 | Vasseur et al. | |
| 2020/0382387 A1 | 12/2020 | Pasupathy et al. | |
| 2021/0224676 A1* | 7/2021 | Arzani | H04L 41/507 |
| 2021/0227438 A1* | 7/2021 | Xu | H04W 4/02 |

FOREIGN PATENT DOCUMENTS

WO      2020214173      10/2020

* cited by examiner

*Primary Examiner* — Mansour Oveissi
(74) *Attorney, Agent, or Firm* — Behmke Innovation Group LLC; Kenneth J. Heywood; Jonathon P. Western

(57) ABSTRACT

In one embodiment, a device obtains routing forecasts for a software defined network. The device splits a particular routing policy for the software defined network into two or more routing policies, based on the routing forecasts. The device makes an evaluation as to whether the two or more routing policies should be reverted back into the particular routing policy. The device sends, to a user interface, data indicative of the particular routing policy that was split into the two or more routing policies and the evaluation as to whether the two or more routing policies should be reverted back into the particular routing policy.

20 Claims, 11 Drawing Sheets

PREDICTIVE ROUTING-BASED POLICY ADJUSTMENTS IN SOFTWARE-DEFINED NETWORKS

TECHNICAL FIELD

The present disclosure relates generally to computer networks, and, more particularly, to predictive routing-based policy adjustments in software defined networks (SDNs).

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits.

With the recent evolution of machine learning, predictive failure detection and proactive routing in an SDN/SD-WAN now becomes possible through the use of machine learning techniques. However, simply driving routing policy changes, automatically, based on predicted failures can.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
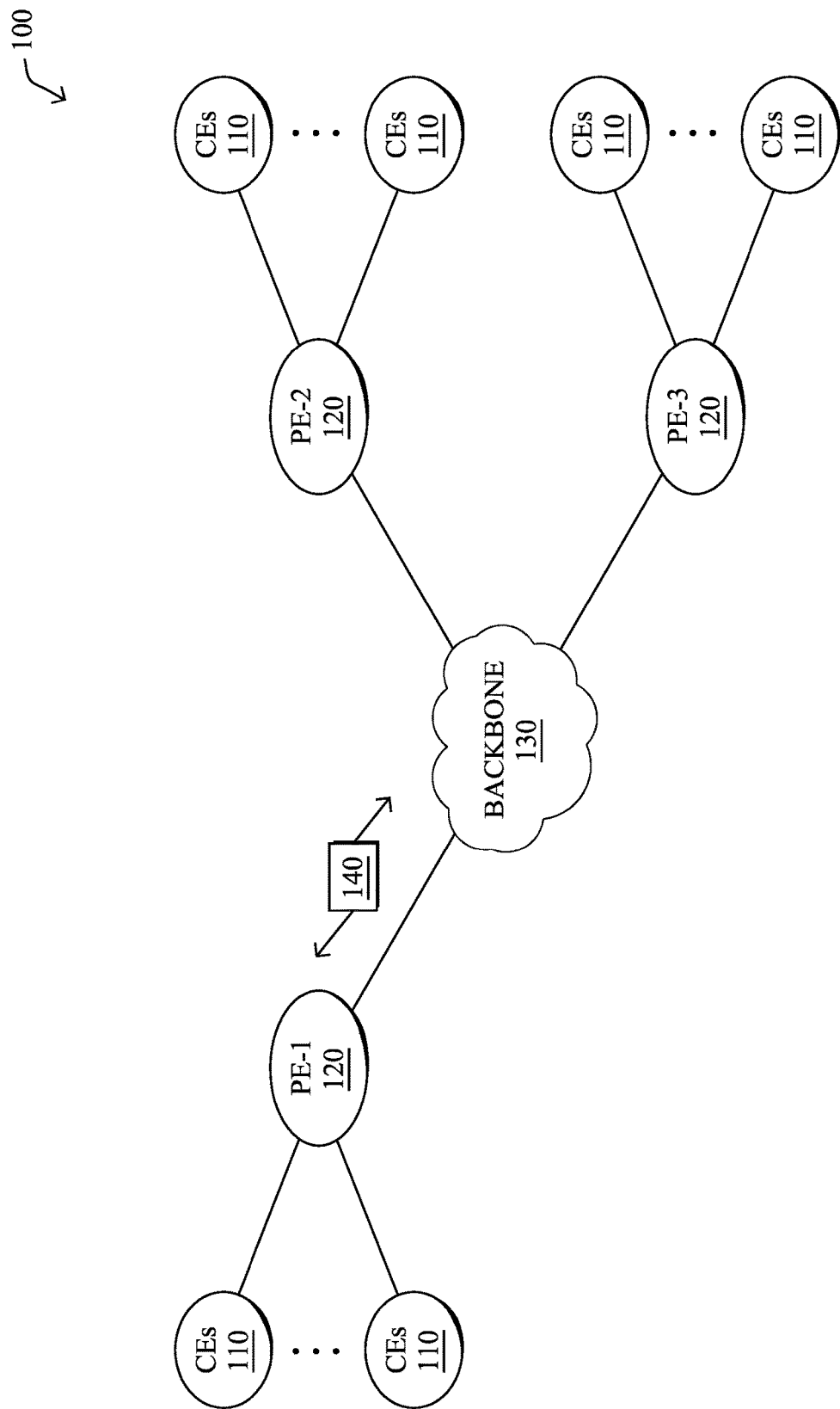
FIGS. 1A-1B illustrate an example communication network.

According to one or more embodiments of the disclosure a device obtains routing forecasts for a software defined network. The device splits a particular routing policy for the software defined network into two or more routing policies, based on the routing forecasts. The device makes an evaluation as to whether the two or more routing policies should be reverted back into the particular routing policy. The device sends, to a user interface, data indicative of the particular routing policy that was split into the two or more routing policies and the evaluation as to whether the two or more routing policies should be reverted back into the particular routing policy.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
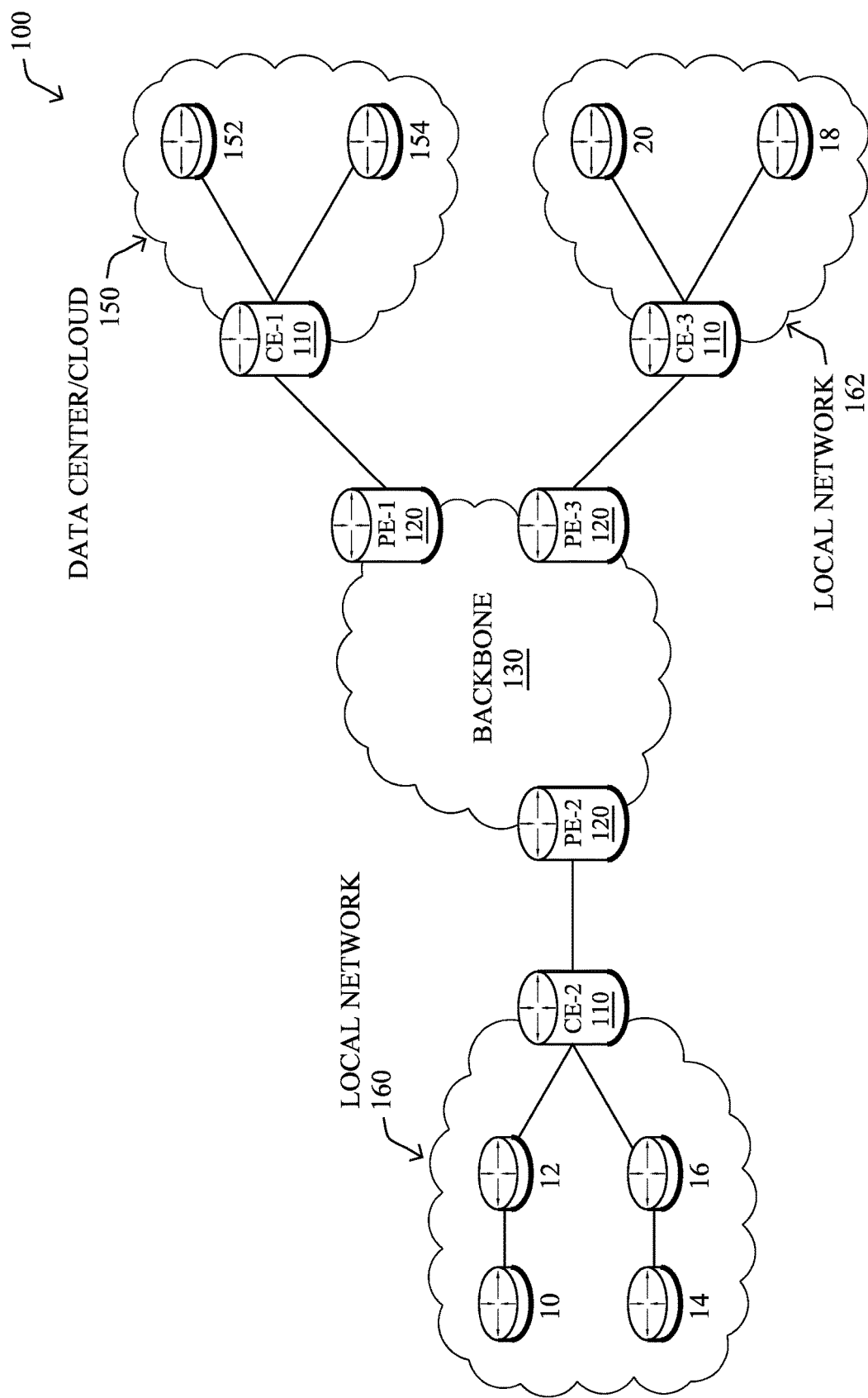

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
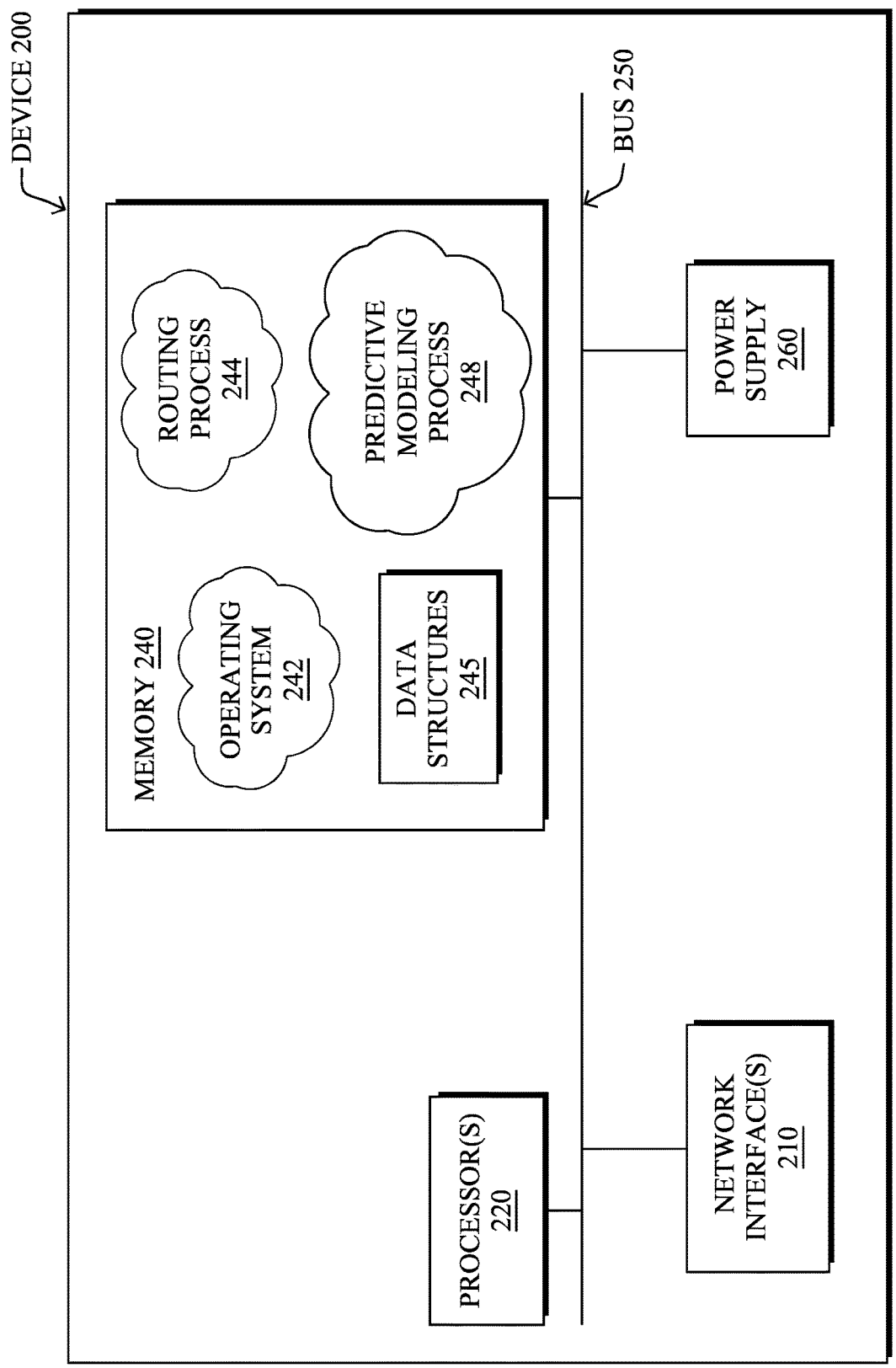
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a predictive modeling process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or predictive modeling process 248 may also include computer executable instructions that, when executed by processor(s) 220, cause device 200 to perform the techniques described herein. To do so, in some embodiments, routing process 244 and/or predictive modeling process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or predictive modeling process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of a current or upcoming link failure or service level agreement (SLA) violation. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or predictive modeling process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that a particular network path will fail or not satisfy the SLA of the traffic on that path. Conversely, the false negatives of the model may refer to the number of times the model incorrectly predicted that the path would not fail or not violate the SLA of the traffic. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
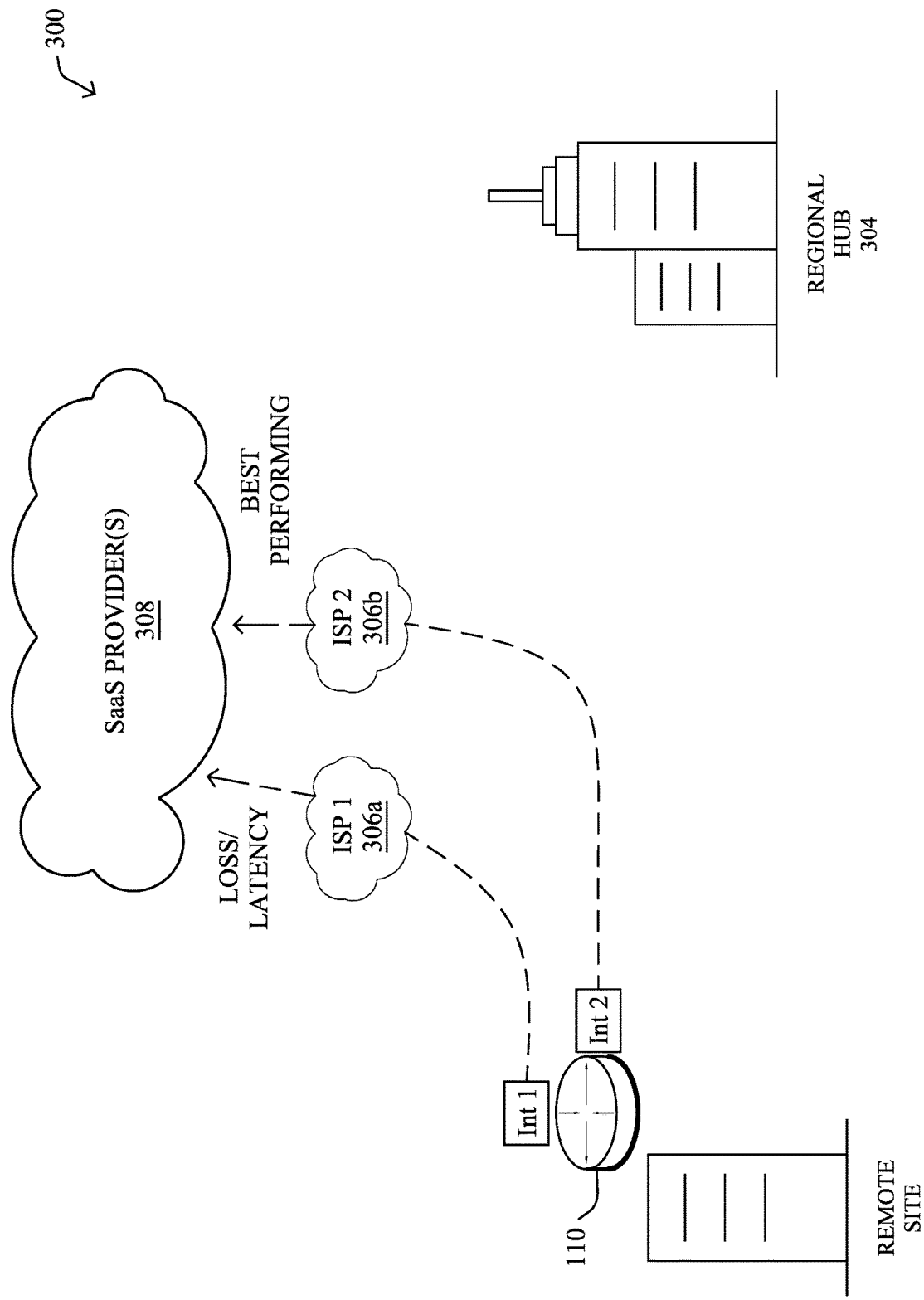
FIGS. 3A-3B illustrate example network deployments.
Figure 3B:
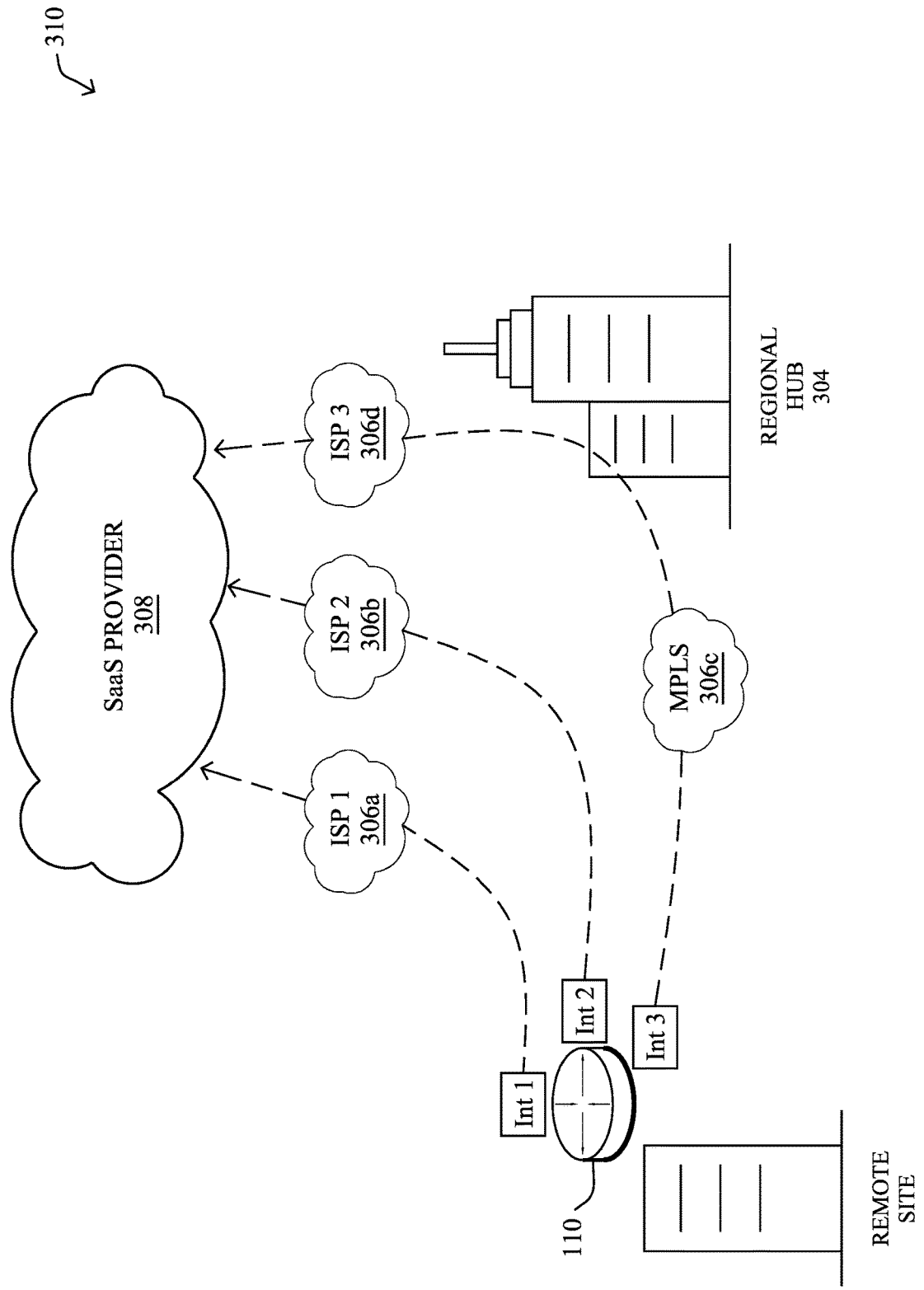

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
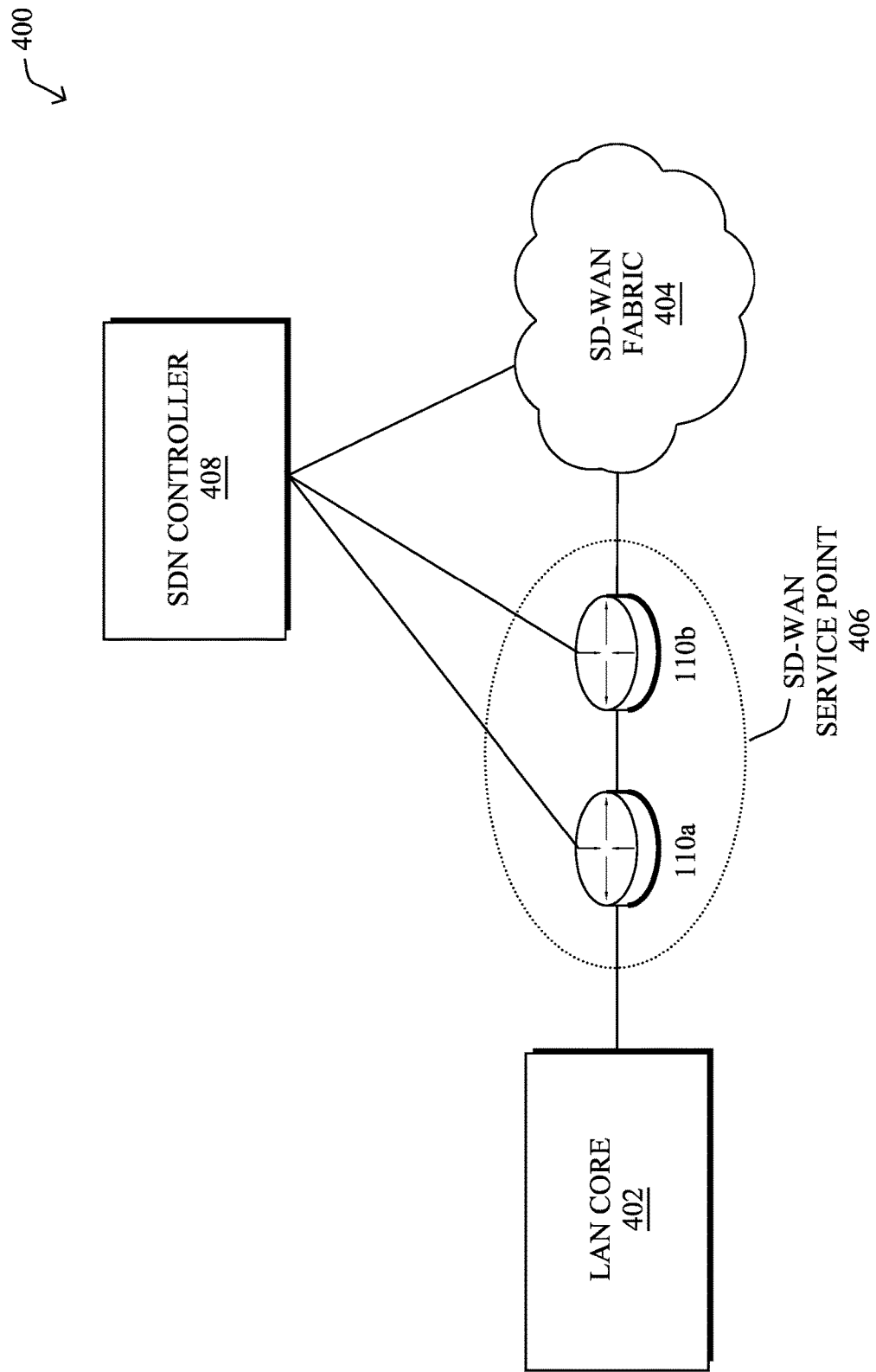
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
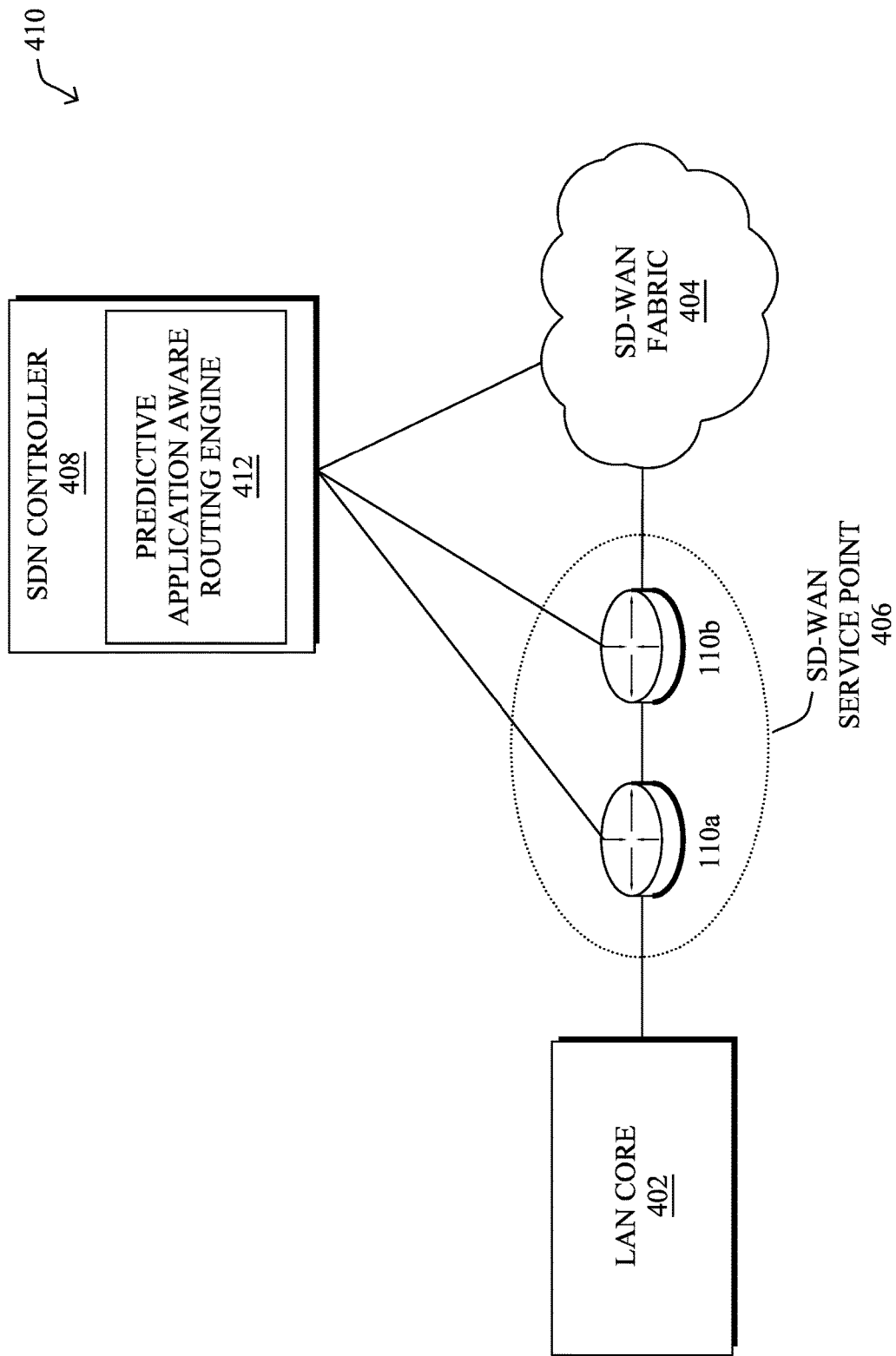

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or predictive modeling process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As noted above, SDN controllers, such as SDN controller 408, have traditionally relied on reactive routing techniques. Accordingly, SDN controllers today rely on user-specified routing policies and configuration changes. However, the proactive routing techniques herein represent a paradigm change whereby link and/or path failures, SLA violations, and the like, can be forecasted/predicted. This presents an opportunity to automatically make decisions and implement configuration changes within the SDN. However, automatically generated configuration changes can cause various issues when left unchecked. Indeed, automatically generated configurations might become hard to understand for users, and rolling out configuration changes can consume a significant amount of time and resources for both the SDN controller and on the routers. Thus, routing forecasts should be gracefully incorporated into the local/existing policies specified by the users, such as by avoiding fragmenting such policies and reducing the resulting overhead on the SDN controller and the routers.

Predictive Routing-Based Policy Adjustments in SDNs

The techniques introduced herein allow for an application-aware, proactive routing engine to anticipate application disruptions and proactively re-route traffic on alternate paths in a manner that addresses some of the key operational challenges in implementing automatic configuration changes. In some aspects, the techniques herein may be used to evaluate potential routing policy changes, before they are implemented, so as to favor efficiency and/or simplicity. In further aspects, the techniques herein also afford a user, such as a network administrator, insight into the evaluation, as well as control over the policy changes.

Illustratively, the techniques described herein may be performed by hardware, software, and/or firmware, such as in accordance with predictive modeling process 248, which may include computer executable instructions executed by the processor 220 (or independent processor of interfaces 210) to perform functions relating to the techniques described herein (e.g., in conjunction with routing process 244).

Specifically, according to various embodiments, a device obtains routing forecasts for a software defined network. The device splits a particular routing policy for the software defined network into two or more routing policies, based on the routing forecasts. The device makes an evaluation as to whether the two or more routing policies should be reverted back into the particular routing policy. The device sends, to a user interface, data indicative of the particular routing policy that was split into the two or more routing policies and the evaluation as to whether the two or more routing policies should be reverted back into the particular routing policy.

Figure 5:
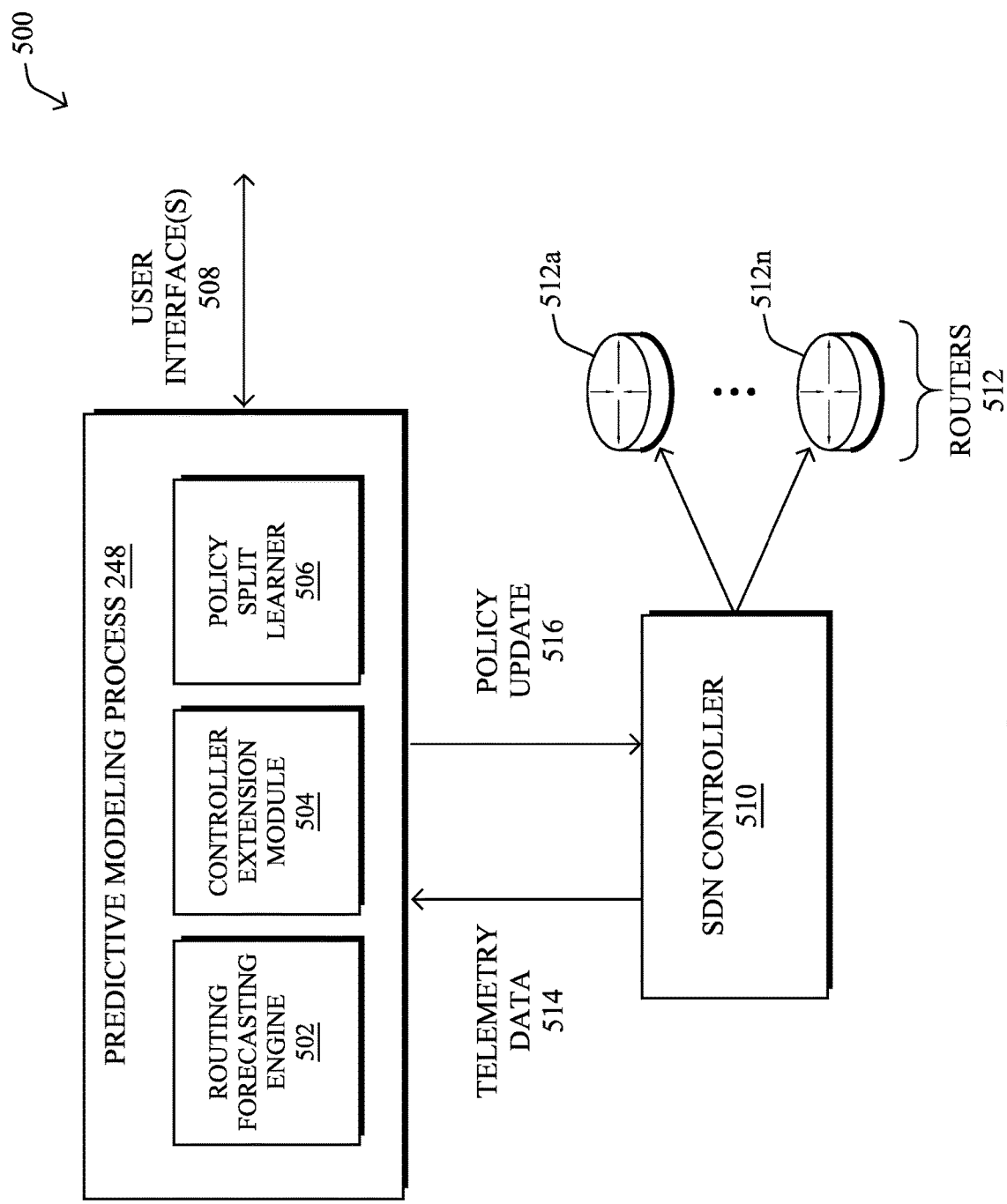
FIG. 5 illustrates an example architecture for replacing static routing metrics with probabilistic models.

Operationally, FIG. 5 illustrates an example architecture 500 architecture for replacing static routing metrics with probabilistic models, according to various embodiments. At the core of architecture 500 is predictive modeling process 248, which may be executed by a supervisory device of a network or another device in communication therewith. For instance, predictive modeling process 248 may be executed by an SDN controller (e.g., SDN controller 408 as part of predictive application aware routing engine 412 in FIGS. 4A-4B), a particular networking device in the network (e.g., a router, etc.), or another device in communication therewith. For instance, while predictive modeling process 248 may be executed, in whole or in part, by an SDN controller 510, it may alternatively be implemented by another device or server with which the controller communicates, such as via an exposed application programming interface (API) or the like.

As shown, predictive modeling process 248 may include any or all of the following components: a routing forecasting engine 502, a controller extension module 504, and/or a policy split learner 506. As would be appreciated, the functionalities of these components may be combined or omitted, as desired. In addition, these components may be implemented on a singular device or in a distributed manner, in which case the combination of executing devices can be viewed as their own singular device for purposes of executing predictive modeling process 248.

In various embodiments, predictive modeling process 248 may include routing forecasting engine 502 that is configured to take as input network telemetry data 514 regarding (e.g., measured loss, jitter, delays, etc. along the network paths/tunnels) and generate a probabilistic forecast $Pr_{p,i}$ that a path p will exhibit an SLA violation during a time interval i. For instance, forecasting engine 502 may include one or more time-series models, such as an AutoRegressive Integrated Moving Average (ARIMA)-based model, a Long Short-Term Memory (LSTM)-based model, or the like, and may, in some embodiments, also generate an uncertainty estimate $\sigma_{p,i}$ for its forecast. While input network telemetry data 514 may typically be sourced from the network being controlled by SDN controller 510, further embodiments provide for input network telemetry data 514 to be sourced from any number of other networks or sources (e.g., other networks using similar paths or sub-segments of the paths, internet weather services, etc.), as well.

Based on the above predictions, routing forecasting engine 502 may also identify the target path to which the traffic should be rerouted. For instance, assume that routing forecasting engine 502 has determined that path A is likely to cause an SLA violation for its application traffic at time X. However, routing forecasting engine 502 may also determine that path B is also not likely to cause an SLA violation at time X. In such a case, routing forecasting engine 502 may identify path as the target path to which the traffic should be rerouted, in advance of time X.

Accordingly, routing forecasting engine 502 may generate provide routing forecast records that include any or all of the following:
  appClass: the application or class of applications to be re-routed.
  validity: the time interval during which the forecast is valid, which essentially corresponds to the period of time during which the disruption is expected to happen on the source path,
  sourcePath: the path on which the disruption is expected to happen.
  targetPath: the path to which the traffic of class appClass should be rerouted to maximize the expected savings.
  confidenceMetric: in addition to the above, routing forecasting engine 502 may also compute and provide the degree of confidence that it has in its predictions.

Another component of predictive modeling process 248 may be controller extension module 504, according to various embodiments. During operation, controller extension module 504 receives the routing forecasts from routing forecasting engine 502 and updates the configured policies for routers 512, accordingly. Controller extension module 504 may also monitors the validity of such changes, and revert them to the original configuration upon expiration of the forecast validity.

In various embodiments, controller extension module 504 may iterate over each forecast from routing forecasting engine 502 and adjust the routing policies of SDN controller 510, accordingly, To this end, controller extension module 504 may seek to optimize the policy adjustments with either or both of the following objectives:
  Efficiency: here, the objective may be to save as much traffic as possible by applying as many routing forecasts from routing forecasting engine 502 as possible.
  Simplicity: here, the objective may be to avoid, whenever possible, fragmentation of an existing routing policy, unnecessarily. As would be appreciated, fragmenting a routing policy will increase the complexity and overhead, both for SDN controller 510 itself, as well as the administrator(s) overseeing the routing policies of the network. Indeed, one of the best practices of SD-WAN is to use similar templates for as many sites as possible, thus simplifying the configuration management of the network.

Unfortunately, efficiency and simplicity are often traded off for one another. For instance, assume that an administrator has defined a routing policy for voice traffic that specifies that the traffic should use MPLS on ISP X on sites A, B, C, and D. Now, assume that routing forecasting engine 502 has forecast a disruption on the link for site A, only, with a target path on the public Internet on ISP Y, instead. Two options are now available to controller extension module 504:
  Favor efficiency by splitting the existing routing policy P into two policies P1 and P2. P1 would keep MPLS on ISP A for sites B, C, and D. P2 would specifically use Internet on site A.
  Favor simplicity by either: 1.) updating policy P to use Internet on all four sites or 2.) skip adjusting policy P. potentially leading to an SLA violation.

While splitting a policy into two policies may seem rather innocuous at first sight, one needs to remember that large networks can be composed of thousands of paths, all potential targets of a routing forecast, so the complexity stemming from strictly favoring consistency can be truly prohibitive. Faced with this dilemma, controller extension module 504 may do the following:
  Assess the violation probabilities from routing forecasting engine 502, should voice traffic from site A. C and D be rerouted on Internet via ISP Y.
  If a reroute to this path for voice traffic is expected to lead to no change (or even an improvement that was not deemed important enough by Alto), controller extension module 504 may decide to update the policy for all sites, instead of having to split the existing policy into two differentiated policies.
  If degradation is expected on any of these sites, then either:
    Controller extension module 504 may favor efficiency and split the policy into multiple parts.

If the expected impact of the SLA violation is small enough (e.g., below a certain threshold), controller extension module 504 may opt to skip the change, entirely.

While the techniques herein provide for controller extension module 504 making decision, autonomously, further embodiments provide for controller extension module 504 instead seeking input from a network administrator via user interface(s) 508. For instance, controller extension module 504 may provide contextual information regarding the decision to a user interface 508, so that the administrator can make the final decision.

Predictive modeling process 248 may further include policy split learner 506, in various embodiments. Generally speaking, policy split learner 506 is responsible for measuring the efficacy of previous decisions on consistency (e.g., based on telemetry data 514), to adjust how controller extension module 504 makes future decisions based on the trade-off between efficacy achieved and the cost of splitting a routing policy into multiple policies. In other words, policy split learner 506 may evaluate the policy splitting decisions by controller extension module 504 and adjust its tradeoffs, based on the effects of the decisions.

For instance, assume that controller extension module 504 opts to split an existing routing policy into two policies that treat a specific type of application traffic differently (e.g., based on their associated sites, etc.). In such a case, policy split learner 506 may maintain a log of the number of minutes saved by the decision to split the existing policy. Such a log may maintain features like the source path, alternate path, application class, number of minutes predicted to be saved, number of minutes, and sessions actually saved. When the change is scheduled to be applied again (e.g., by splitting an existing policy) between the same source and alternate path, and for the same application, then policy split learner 506 may only decide to split if the savings is above a defined threshold (e.g., a number of minutes or sessions, etc.). In other embodiments, policy split learner 506 may also consider the uncertainty of the savings (e.g., the standard deviation of savings). In turn, policy split learner 506 may determine that a policy change should be applied, if the mean savings is greater than a threshold and if the standard deviation is lesser than a threshold.

Another potential function of or controller extension module 504 may be to consider when a splitting or other change to a routing policy should be made permanent. Indeed, at times, policies may be recurring, for instance, a disruption happening on a given ISP every weekday from 16:00 to 18:00. In this case, controller extension module 504 may flag the routing forecast as being recurring for N-number of days/weeks. In turn, controller extension module 504 may provide contextual information to user interface(s) 508, asking a network operator whether to make the configuration change permanent, yet time-dependent. In other words, controller extension module 504 may notify the network operator of such a recurring change, asking for a confirmation to make this change permanent, yet time-varying. In other words, controller extension module 504 may constantly apply and remove the change every weekday. This has the advantage of being reproducible and transparent for the network operator. When the target SDN controller 510 supports time-dependent policies, controller extension module 504 may, of course, se this capability, automatically.

Figure 6A:
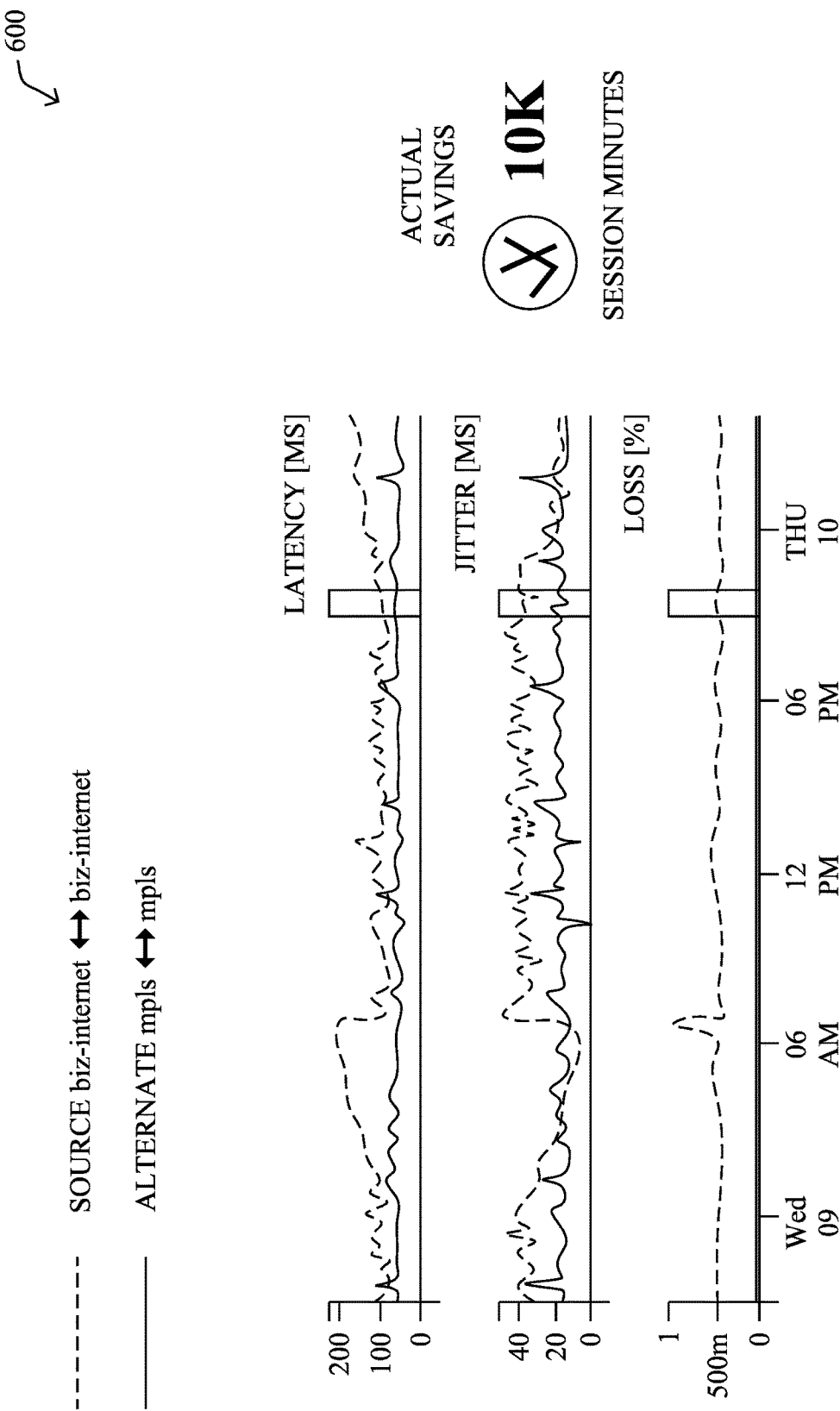
FIGS. 6A-6B illustrate example display data for presentation by a user interface.

Another potential capability of controller extension module 504 is to provide visualization data to user interface(s) 508 regarding the operations of predictive modeling process 248 and its effect on the network. For instance, FIG. 6A illustrates an example indication 600 that may be displayed to a user regarding the total time savings (in session-minutes) by implementing a particular policy change. Here, indication 600 may also include a time series that compares the QoS provided on both the original path (called SOURCE) and the path selected by predictive modeling process 248 (called ALTERNATE), thus proving that the forecast was correct.

Figure 6B:
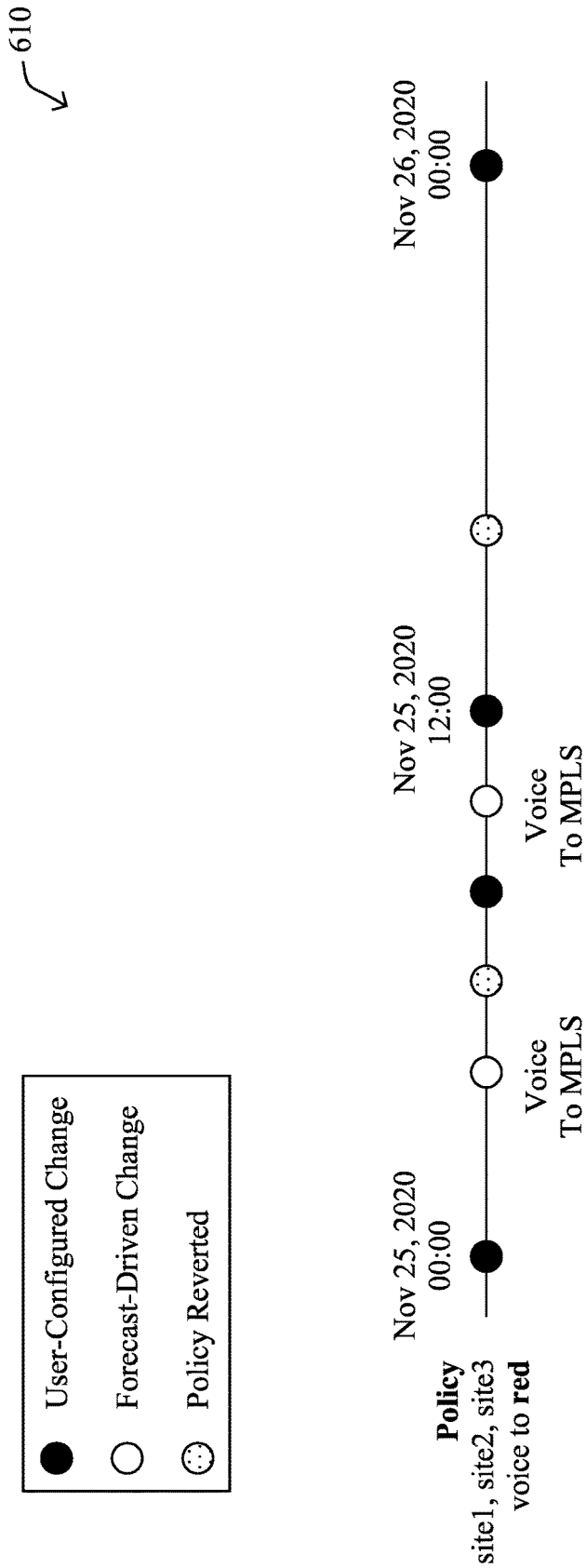

FIG. 6B illustrates another indication 610 that may be provided to user interface(s) 508 in FIG. 5, according to various embodiments. As shown, indication 610 may depict a timeline of changes made with respect to a particular routing policy, indicating when changes were made by the user (i.e., a user-configured change), by the predictive system (i.e., a forecast-driven change), or reverted. For instance, as part of its operation, the system may determine that some or all of the traffic to which the policy applies should be rerouted onto a different path, for a certain amount of time, before returning to relying on the initial policy. Such an indication allows a network operator to understand what changes are made by the predictive system and revert them, if needed. The operator may also interact with this screen or a different screen, to render a given change permanent, if relevant.

Figure 7:
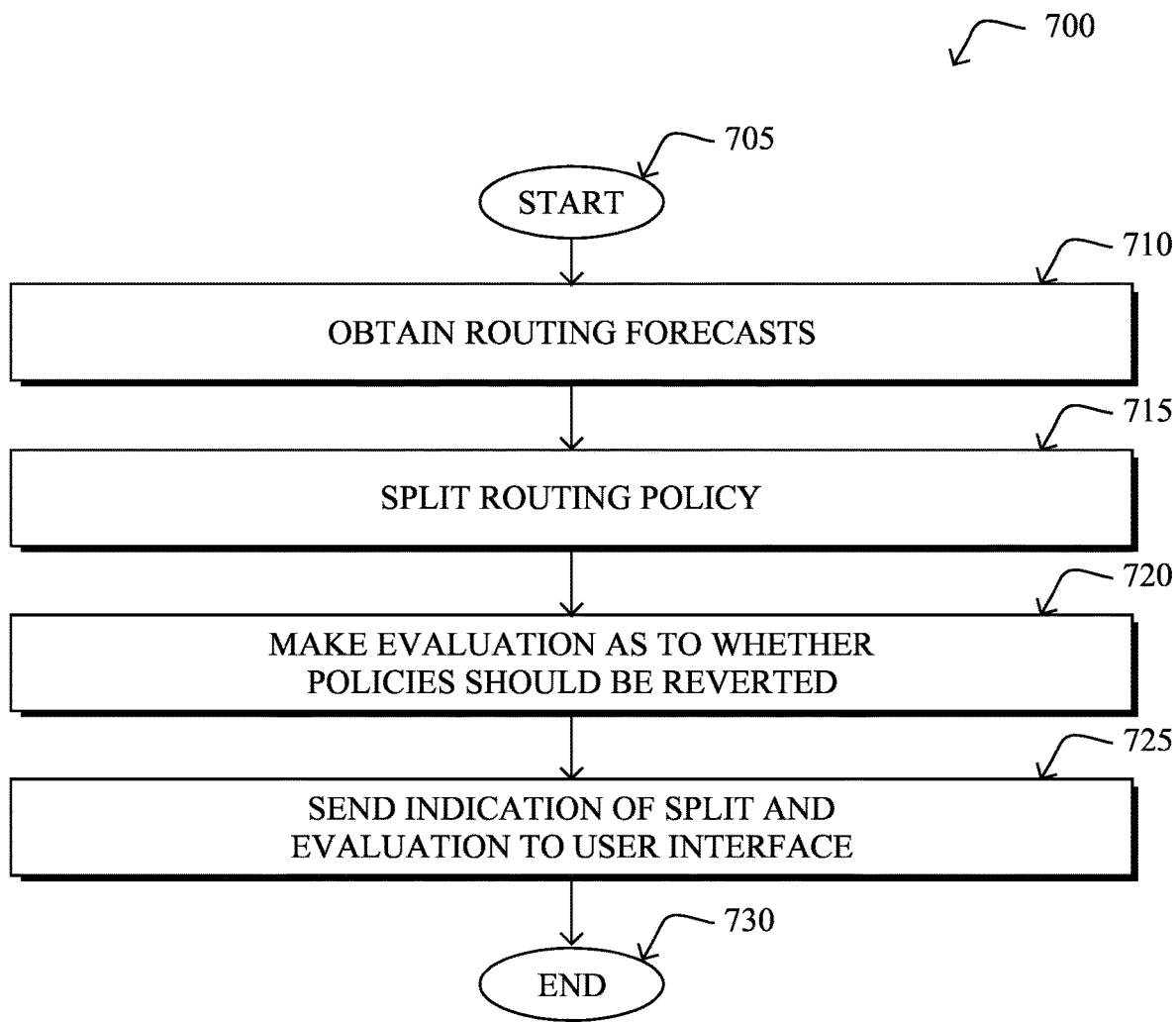
FIG. 7 illustrates an example simplified procedure for adjusting a routing policy in an SDN.

FIG. 7 illustrates an example simplified procedure for adjusting a routing policy in an SDN, in accordance with one or more embodiments described herein. For example, a non-generic, specifically configured device (e.g., device 200), such as a networking device (e.g., a router, an SDN controller for an SD-WAN, etc.), or a device in communication therewith, may perform procedure 700 by executing stored instructions (e.g., predictive modeling process 248 and/or routing process 244). The procedure 700 may start at step 705, and continues to step 710, where, as described in greater detail above, the device may obtain routing forecasts for the SDN. For instance, such routing forecasts may be generated by a machine learning-based forecasting engine trained to forecast link failure and/or SLA violations, based on telemetry data captured regarding the SDN. Such a forecasting engine may be executed directly by the device, in some cases. In other instances, the device may obtain the forecasts via an API or other mechanism from the device(s) executing the forecasting engine.

At step 715, as detailed above, the device may split a particular routing policy for the SDN into two or more routing policies, based on the routing forecasts. In some embodiments, the device may do so in part by determining whether all traffic flows to which the particular routing policy applies should be rerouted, thereby favoring simplicity. In further embodiments, the device may do so in part by determining that at least one traffic flow to which the particular routing policy applies should remain on its current routing path in the SDN, thereby favoring efficiency. Indeed, rerouting traffic can be resource-intensive and may be avoided, if possible.

At step 720, the device may make an evaluation as to whether the two or more routing policies should be reverted back into the particular routing policy, as described in greater detail above. For instance, the device may obtain telemetry data regarding the performance of both the new routing paths for the affected traffic, as well as the prior routing paths, to assess whether the predicted failure or SLA violation actually occurred, whether the new path. In further embodiments, the device may evaluate whether the new routing polices should be temporary in nature, such as when the predicted failure or SLA violation is transitory or seasonal in nature.

At step 725, as detailed above, the device may send data to a user interface that is indicative of the particular routing policy that was split into the two or more routing policies and the evaluation as to whether they should be reverted back into the particular routing policy. For instance, the device may send a timeline or other graphical indication of the policy changes for display to the user. In some instances, the device may automatically revert the policies back to the particular policy and provide information regarding this change to the user interface. In other instances, the device may only revert the policies back to the original policy in response to a request from the user interface to do so. Conversely, the user may opt to make the change permanent, in which case the device may receive an indication from the user interface that the two or more routing policies should be made permanent. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the implementation of proactive routing in an SDN to avoid forecasted failures, SLA violations, etc., in a way that reduces resource consumption in the SDN and in a manner that is user-friendly for the network administrator. Today, routing changes in an SDN are reactive in nature and do not drive routing policy changes, automatically.

While there have been shown and described illustrative embodiments that provide for predictive routing-based policy adjustments in SDNs, it is to be understood that various other adaptations and modifications may be made within the spirit and scope of the embodiments herein. For example, while certain embodiments are described herein with respect to using certain models for purposes of predicting link failures or SLA violations, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a device, routing forecasts for a software defined network, at least one of the routing forecasts predicting a link failure or a service level agreement (SLA) violation in the software defined network;
   splitting, by the device, a particular routing policy for the software defined network into two or more routing policies, based on the routing forecasts;
   making, by the device and based on an assessment of whether the predicted link failure or SLA violation actually occurred in the software defined network, an evaluation as to whether the two or more routing policies should be reverted back into the particular routing policy; and
   sending, by the device and to a user interface, data indicative of the particular routing policy that was split into the two or more routing policies and the evaluation as to whether the two or more routing policies should be reverted back into the particular routing policy.

2. The method as in claim 1, wherein the software defined network comprises a software-defined wide area network (SD-WAN).

3. The method as in claim 1, wherein the particular routing policy was user-specified.

4. The method as in claim 1, wherein the routing forecasts are generated by a machine learning-based forecasting engine trained to forecast link failures or SLA violations in the software defined network.

5. The method as in claim 1, further comprising:
   reverting, by the device and based on the evaluation, the two or more routing policies back into the particular routing policy.

6. The method as in claim 5, wherein the device reverts the two or more routing policies back into the particular routing policy, in response to a request from the user interface to do so.

7. The method as in claim 5, wherein the device reverts the two or more routing policies back into the particular routing policy, automatically.

8. The method as in claim 1, wherein splitting the particular routing policy for the software defined network into two or more routing policies comprises:
   determining that at least one traffic flow to which the particular routing policy applies should remain on its current routing path in the software defined network.

9. The method as in claim 1, wherein splitting the particular routing policy for the software defined network into two or more routing policies comprises:
   determining, based on the routing forecasts, whether all traffic flows to which the particular routing policy applies should be rerouted or only a subset of the traffic flows to which the particular routing policy applies should be rerouted.

10. The method as in claim 1, further comprising:
    receiving, at the device and via the user interface, an indication that the two or more routing policies should be made permanent; and, in response,
    permanently replacing the particular routing policy with the two or more routing policies.

11. An apparatus, comprising:
    one or more network interfaces;
    a processor coupled to the one or more network interfaces and configured to execute one or more processes; and
    a memory configured to store a process that is executable by the processor, the process when executed configured to:
    obtain routing forecasts for a software defined network, at least one of the routing forecasts predicting a link failure or a service level agreement (SLA) violation in the software defined network;

split a particular routing policy for the software defined network into two or more routing policies, based on the routing forecasts;

make, based on an assessment of whether the predicted link failure or SLA violation actually occurred in the software defined network, an evaluation as to whether the two or more routing policies should be reverted back into the particular routing policy; and send, to a user interface, data indicative of the particular routing policy that was split into the two or more routing policies and the evaluation as to whether the two or more routing policies should be reverted back into the particular routing policy.

12. The apparatus as in claim 11, wherein the software defined network comprises a software-defined wide area network (SD-WAN).

13. The apparatus as in claim 11, wherein the particular routing policy was user-specified.

14. The apparatus as in claim 11, wherein the routing forecasts are generated by a machine learning-based forecasting engine trained to forecast link failures or SLA violations in the software defined network.

15. The apparatus as in claim 11, wherein the process when executed is further configured to:

revert, based on the evaluation, the two or more routing policies back into the particular routing policy.

16. The apparatus as in claim 15, wherein the apparatus reverts the two or more routing policies back into the particular routing policy, in response to a request from the user interface to do so.

17. The apparatus as in claim 11, wherein the apparatus splits the particular routing policy for the software defined network into two or more routing policies by:

determining that at least one traffic flow to which the particular routing policy applies should remain on its current routing path in the software defined network.

18. The apparatus as in claim 11, wherein the apparatus splits the particular routing policy for the software defined network into two or more routing policies by:

determining, based on the routing forecasts, whether all traffic flows to which the particular routing policy applies should be rerouted or only a subset of the traffic flows to which the particular routing policy applies should be rerouted.

19. The apparatus as in claim 11, wherein the process when executed is further configured to:

receiving, via the user interface, an indication that the two or more routing policies should be made permanent; and, in response, permanently replacing the particular routing policy with the two or more routing policies.

20. A tangible, non-transitory, computer-readable medium storing program instructions that cause a device to execute a process comprising:

obtaining, by the device, routing forecasts for a software defined network, at least one of the routing forecasts predicting a link failure or a service level agreement (SLA) violation in the software defined network;

splitting, by the device, a particular routing policy for the software defined network into two or more routing policies, based on the routing forecasts;

making, by the device and based on an assessment of whether the predicted link failure or SLA violation actually occurred in the software defined network, an evaluation as to whether the two or more routing policies should be reverted back into the particular routing policy; and sending, by the device and to a user interface, data indicative of the particular routing policy that was split into the two or more routing policies and the evaluation as to whether the two or more routing policies should be reverted back into the particular routing policy.

\* \* \* \* \*

UNITED STATES PATENT AND TRADEMARK OFFICE
CERTIFICATE OF CORRECTION

PATENT NO. : 11,483,234 B2
APPLICATION NO. : 17/191233
DATED : October 25, 2022
INVENTOR(S) : Grégory Mermoud et al.

It is certified that error appears in the above-identified patent and that said Letters Patent is hereby corrected as shown below:

In the Specification

Column 11, Line 63, please amend as shown:
on the source path.

Column 12, Line 16, please amend as shown:
510, accordingly. To this end, controller extension module Column 12, Line 46, please amend as shown:
Internet on all four sites or 2.) skip adjusting policy P, Column 12, Line 56, please amend as shown:
engine 502, should voice traffic from site A, C and D be Signed and Sealed this
Twenty-fourth Day of January, 2023

Katherine Kelly Vidal
*Director of the United States Patent and Trademark Office*